United States Patent [19]

Altieri et al.

[11] Patent Number: 5,554,660
[45] Date of Patent: Sep. 10, 1996

[54] WATER HUMIDITY RESISTANT STARCH FOAMS

[75] Inventors: Paul A. Altieri, Belle Mead; Martin M. Tessler, Edison, both of N.J.

[73] Assignee: National Starch and Chemical Investment Holding Corporation, Wilmington, Del.

[21] Appl. No.: 414,862

[22] Filed: Mar. 31, 1995

[51] Int. Cl.$^6$ .............................. C08L 3/06; C08L 3/08; C08J 9/00
[52] U.S. Cl. ................... 521/81; 524/50; 524/51; 525/54.31
[58] Field of Search .................. 521/81; 524/50, 524/51; 525/54.31

[56] References Cited

U.S. PATENT DOCUMENTS

| | | | |
|---|---|---|---|
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |
| 5,153,037 | 10/1992 | Altieri | 428/35.6 |
| 5,158,810 | 10/1992 | Oishi et al. | 428/35.4 |
| 5,436,078 | 7/1995 | Bühler et al. | 428/474.4 |

FOREIGN PATENT DOCUMENTS

WO93/20110  10/1993  WIPO.

Primary Examiner—Jeffrey C. Mullis
Attorney, Agent, or Firm—Eugene Zagarella, Jr.

[57] ABSTRACT

An expanded foamed starch product with improved water/humidity resistance comprising the combination of a starch or flour modified with alkylene oxide and a starch ester having an intermediate DS of from about 1.0 to 1.8 or a flour ester having a DS of 0.3 to 1.1.

23 Claims, No Drawings

WATER HUMIDITY RESISTANT STARCH FOAMS

BACKGROUND OF THE INVENTION

This invention relates to expanded or foamed starch products having improved water and/or humidity resistant properties which comprise a select combination of starch or flour modified with alkylene oxide and a starch ester having an intermediate DS of from about 1.0 to 1.8 or a flour ester having a DS of from about 0.3 to 1.1.

The ability to provide expanded products using starch material has recently taken on increased interest because of the biodegradable nature of such materials. This biodegradable attribute possessed by starch lends itself to the formation of products which are environmentally safe and friendly. The term "biodegradable" as used herein refers to the susceptibility of a substance to decomposition by living things (organisms/microorganisms) and/or natural environmental factors, e.g., the ability of compounds to be chemically broken down by bacteria, fungi, molds and yeast. Plastics used in packaging and other structural applications are not biodegradable.

Despite the known biodegradable characteristics of starch, it has not been easy to convert starch based materials into formed structured products because it lacks some of the physical properties needed, particularly under high humidity conditions.

The use of starch and derivatives thereof to form various shaped articles has been shown in a number of recent patent publications. U.S. Pat. Nos. 5,035,930 and 5,043,196 issued on Jul. 30, 1991 and Aug. 27, 1991, respectively, disclose foamed shaped products formed from high amylose starch and particularly alkylene oxide modified starch. U.S. Pat. No. 5,095,054 issued on Mar. 10, 1992, discloses shaped articles having dimensional stability and enhanced physical properties that are made from a thermoplastic polymer composition comprising a destructurized starch and a hydrophobic, water insoluble polymer or compound having one or more functional groups. Melt-molded articles formed of starch or a starch-derived macromolecular substance in combination with an oxyalkylene group-containing vinyl alcohol copolymer are disclosed in U.S. Pat. No. 5,158,810 issued Oct. 27, 1992. In U.S. Pat. No. 5,153,037 issued Oct. 6, 1992, biodegradable foamed shaped products formed of an expanded modified flour are shown while in WO 93/20110 published Oct. 14, 1993, shaped articles formed from a melt comprising high DS starch esters of greater than 1.5 and especially 1.8 to 2.9 DS are disclosed.

Notwithstanding the number of recent disclosures showing articles formed from starch, there still is the need for foamed or expanded starch articles which not only are biodegradable but have excellent water and/or humidity resistant properties.

SUMMARY OF THE INVENTION

This invention relates to a biodegradable expanded starch product having improved water and/or humidity resistant properties, said starch product comprising the combination of a starch or flour modified with alkylene oxide and a starch ester having a DS of from about 1.0 to 1.8 or a flour ester having a DS of 0.3 to 1.1. More particularly, the expanded starch product of this invention comprises the combination of a) from about 25 to 90% by weight of starch or flour which is modified with up to 15% by weight of alkylene oxide containing 2 to 6 carbon atoms and b) from about 10 to 75% by weight starch ester having a degree of substitution of from about 1.0 to 1.8 or flour ester having a degree of substitution of 0.3 to 1.1.

DETAILED DESCRIPTION OF THE INVENTION

This ability to provide expanded starch products having improved water and/or humidity resistant properties was developed by providing a select combination of starch or flour ethers and starch or flour esters. The starch or flour ethers comprise starch or flour modified with alkylene oxide while the esters are either starch esters having a DS of from about 1.0 to 1.8 or flour esters having a DS of about 0.3 to 1.1.

The starting or base materials useful in this invention to provide the starch ethers and starch esters may be any of several starches, native or converted. Such starches include those derived from any plant source including corn, potato, wheat, sago, tapioca, waxy maize, sorghum and high amylose corn, etc. Also included are the conversion products derived from any of the former bases including, for example, dextrin prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches.

Flour may also be used as the base material in forming the ethers and esters of this invention. Such flours typically comprise protein (about 8 to 15%), lipids (about 2 to 4%) and starches (about 80 to 90%). Such flours may also be modified or derivatized as the starch materials described above.

The base starch materials which are used to provide both the starch ethers and starch esters preferably are high amylose starches, i.e., starches containing at least 40% by weight amylose. It is well known that starch is composed of two fractions, the molecular arrangement of one being linear and the other being branched. The linear fraction of starch is known as amylose and the branched fraction amylopectin. Starches from different sources, e.g., potato, corn, tapioca, and rice, etc., are characterized by different relative proportions of the amylose and amylopectin components. Some plant species have been genetically developed which are characterized by a large preponderance of one fraction over the other. For instance, certain varieties of corn which normally contain about 22 to 28% amylose have been developed which yield starch composed of over 40% amylose. These hybrid varieties have been referred to as high amylose or amylomaize.

High amylose corn hybrids were developed in order to naturally provide starches of high amylose content and have been available commercially since about 1963. Suitable high amylose starches useful herein are any starches with an amylose content of at least 40% and preferably at least 65% by weight. While high amylose corn starch has been especially suitable, other starches which are useful include those derived from any plant species which produces or can be made to produce a high amylose content starch, e.g., corn, peas, barley and rice. Additionally, high amylose starch can be obtained by separation or isolation such as the fractionation of a native starch material, or by enzymatically debranched starched which yield a starch comprising at least 40% amylose.

The base materials useful in this invention also preferably include high amylose flour where the starch component of the flour contains at least 40% by weight of amylose. When high amylose content of flour is referred to throughout the application and claims, it is understood to refer to the amylose content of the starch component of the flour (e.g., 40% by weight of amylose based on the amount of starch in the flour). Such flour typically comprises protein (about 8 to 13%), lipids (about 2 to 3%) and starches (about 85 to 90%) which include the specified high amylose content.

Another useful high amylose starch is an ae starch or substantially pure starch extracted from a plant source having an amylose extender genotype, the starch comprising less than 10% amylopectin. The ae starch which is useful as the starch base material is derived from a plant breeding population, particularly corn, which is a genetic composite of germplasm selections and comprises at least 75% amylose, optionally at least 85% amylose (i.e., normal amylose) as measured by butanol fractionation/exclusion chromatography techniques. The starch further comprises less than 10%, optionally less than 5%, amylopectin and additionally from about 8 to 25% low molecular weight amylose. The starch is preferably extracted in substantially pure form from the grain of a starch bearing plant having a recessive amylose extender genotype coupled with numerous amylose extender modifier genes. This ae starch and the method of preparation are described in U.S. Pat. No. 5,300,145 issued to V. Fergason et al. on Apr. 5, 1994, which is incorporated herein by reference.

The combination of starch or flour components used in preparing the expanded starch products of this invention include starch or flour ethers and starch or flour esters. The ethers are starch or flour material modified or etherified with alkylene oxides, particularly those containing 2 to 6, preferably 2 to 4 carbon atoms. Ethylene oxide, propylene oxide and butylene oxide are exemplary components that are useful in etherifying the starting starch or flour materials, with propylene oxide being especially preferred. Varying amounts of the alkylene oxides may be used depending on the desired properties and economics. Generally, up to about 15% and preferably up to about 10%, by weight, based on the weight of starch or flour will be used, and more particularly from about 2 to 15%, preferably 2 to 10%.

The second starch component comprising the expanded starch products of this invention are starch or flour ester compounds having 2 to 8 carbon atoms in the ester component and an intermediate degree of substitution (DS) depending on whether the base material is starch or flour. More particularly, when the base material is starch, the ester derivative will have a DS of from about 1.0 to 1.8 and preferably from about 1.2 to 1.6. When the base material is flour, the ester derivative will have a DS of from about 0.3 to 1.1 and preferably 0.7 to 1.0. The term "degree of substitution" (DS) as used herein indicates the average number of sites per anhydroglucose unit of the starch molecule on which there are substituent groups. More particularly, the starch or flour esters comprise ester compounds having the formula:

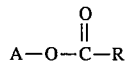

where A is the starch or flour base material and R is an alkyl, aryl, alkaryl or aralkyl of 1 to 7, preferably 1 to 4 carbon atoms. More preferably, the ester compound will have an R which is an alkyl group of 1 to 2 carbon atoms and a DS of from about 1.2 to 1.6. Starch esters of this type include starch acetate, starch propionate, starch butyrate, starch hexanoate, starch benzoate and mixed starch esters, for example, starch acetate/propionate, i.e., where the ester has the formula:

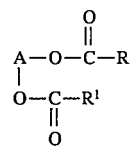

with R and $R^1$ representing different substituent groups as defined above. It is understood that the use of A in the above formula and description and as used throughout this application includes both the starch and flour counterparts.

The modifications of starch and flour to prepare the ethers and esters are well known in the art and a good review of such preparations may be found in R. L. Whisler, J. N. BeMiller and E. F. Paschall, "Starch: Chemistry and Technology", Academic Press, 1984, Chapter X. The starch esters are typically prepared by reacting starch with organic acid anhydrides such as acetic anhydride. For the high levels of DS as required in this invention, solvent systems such as pyridine have been used. However, an improved method for preparing starch esters having the intermediate DS levels as required by this invention was recently disclosed in U.S. Pat. No. 5,321,132 issued to R. Billmers et al. on Jun. 14, 1994, and hereby incorporated by reference. This method involves an aqueous one step process wherein starch is reacted with high treatment levels of organic acid anhydride and high concentrations of alkaline reagents.

The two starch or flour components, i.e., starch or flour ethers and starch or flour esters will be used in proportions of from about 25 to 90% by weight starch ether or flour ether and from about 10 to 75% by weight of starch ester or flour ester. Preferably, these components will be used in amounts of from about 25 to 75% by weight of the starch or flour ethers and from about 25 to 75% by weight of the starch or flour esters and more preferably from about 40 to 60% by weight of each of the starch or flour ethers and starch or flour esters. In addition to the ethers and esters as described above, the composition and product made therefrom may contain from about 0 to 30% by weight of an underivatized starch or flour.

Additive or synthetic compounds may be added to the starch composition to improve properties such as strength, flexibility, color, flame retardancy, density, resiliency, etc. Compounds such as polyvinyl alcohol, ethylene vinyl alcohol, polyvinyl acetate, poly (ethylene vinyl acetate), monoglycerides, styrene acrylate resins are typical additives which may be used. These additives may be used in any amount that will effectively satisfy the desired property, provided the extrusion of the starch and the overall properties of the expanded product are suitable. Generally, up to about 50% by weight of such additives, and preferably 0.1 up to about 10% by weight, may be used.

Additionally, a nucleating agent or salt can be added to the starch or flour components to aid in the extrusion processing and properties of the resulting formed expanded product. Various nucleating agents or salts may be used in this capacity including any inorganic, water soluble salt or mixtures thereof and especially an alkaline metal or alkaline earth metal salt such as sodium sulfate and sodium chloride. Other nucleating agents such as microtalc can also be used. The amount of nucleating agent used will depend on the particular processing conditions and desired product with amounts of about 1 to 8% and more particularly 2 to 5% by weight being found as suitable.

The expanded or foamed products of this invention are prepared using an extrusion process. The formed product is an expanded, closed cell material of relatively low density with good flexibility and/or rigidity as well as resilience and compressibility. The uniform closed cell structure of the expanded product helps to give it desired properties. A closed cell structure is defined as one having largely non-connecting cells, as opposed to open cells which are largely interconnecting or defined as two or more cells interconnected by broken, punctured or missing cell walls. Typically, the tiny bubble formation results in a small cell size of about 50 to 1000 microns.

Generally, properties of the expanded, foamed product will vary widely with the bulk density of the product being from about 2 to 16 lb/ft$^3$, the resiliency at least 20% and the compressibility from about 100 to 800 g/cm$^2$. Methods for determining these properties can be found in U.S. Pat. No. 5,043,196 issued Aug. 27, 1991, which is incorporated by reference herein.

The expanded shaped products of this invention are prepared using an extrusion process. The apparatus used in carrying out the extrusion process may be any screw type extruder. While the use of a single or twin screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder.

Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Different dies and die configurations may be used in the extruder and extrusion depending on the particular form of the expanded starch product that is desired. Annular or tubular dies are one suitable type that can be used.

Variations in any of the elements used in the extruder may be made as desired in accordance with conventional design practices. A further description of extrusion and typical design variations can be found in "Encyclopedia of Polymer Science and Engineering", Vol. 6, 1986, pp. 571 to 631.

In carrying out the extrusion process, temperatures in the extruder will vary depending on the particular material, desired properties and application. They can generally range from about 100° to 250° C. and preferably from about 150° to 210° C. The total moisture content of the starch in the extruder, i.e., moisture present in the inlet fed starch plus water added during processing, will be about 25% or less by weight, based on the weight of starch. More particularly, the total moisture content of the starch will range from about 10 to 25% and preferably from abut 15 to 21%.

This invention is further illustrated by the following examples with all parts and percentages given by weight and all temperatures in degrees Celsius unless otherwise noted.

EXAMPLE 1

Several samples of starch blends containing varying amounts of high amylose starch ethers and starch esters were extruded into foam structures and tested as described below.

The starch ether was a Hylon®VII starch (a product of National Starch and Chemical Company, containing about 70% by weight amylose) hydroxypropylated with 7% by weight of propylene oxide (P.O.). The starch ester was a fluidity Hylon VII starch acetate having a DS of 1.5.

The starch samples containing 17% total moisture were fed to a 30 mm Werner and Pfleiderer co-rotating twin screw extruder having a 1×3 mm die opening at a screw speed of 250 rpm. The temperature in the extruder was increased to a level of about 180° C. in the barrel or section nearest or just before the die. The expanded starch foam samples were tested for shrinkage as shown in following Table 1.

TABLE 1

| STARCH COMPOSITION BLENDS | | | |
|---|---|---|---|
| AMOUNTS | | | |
| HYLON VII ETHER (7% PROPYLENE OXIDE) | HYLON VII ACETATE (DS 1.5) | % SHRINKAGE 90° F./90% RH | |
| | | 1 DAY | 14 DAYS |
| 100 | 0 | 20.5 | >30.0 |
| 75 | 25 | 9.2 | 26.5 |
| 50 | 50 | 0.2 | 0.0 |
| 25 | 75 | 0.0 | 0.0 |

The samples above show a significant increase in resistance to shrinkage as the level of starch acetate was increased to 50%. These products also exhibited reduced disintegration upon contact with water and had an improved surface smoothness as well as desirable qualities of cell structure, compressibility and resilience.

EXAMPLE 2

High amylose flour (containing 10 to 13% protein and 2 to 3% lipids) was treated with propionic anhydride to produce a flour propionate having a DS of 0.7. This material was dry blended with the high amylose starch ether (obtained by treatment with 7% propylene oxide) and about 4.5% nucleating agents (sodium sulfate and microtalc). The blend was extrusion processed as in Example 1 to produce shaped foams having desirable closed cell structure and cushioning properties such as compressibility and resiliency. Furthermore, the foam displayed the following performance in direct contact with water and exposure to high temperature/high humidity conditions.

In addition the foams were evaluated for resistance to direct water content by placing similar sized extrudate pieces into a beaker filled with water and measuring the time for the product to disintegrate. Results are shown below in Table 2.

TABLE 2

| Starch Composition Blends | | | | |
|---|---|---|---|---|
| Amounts | | | | |
| HYLON VII Ether (7% propylene oxide) | HYLON VII Flour propionate (DS = 0.7) | % Shrinkage 90 F./90% RH | | Disintegration in water (minutes) |
| | | 1 Day | 14 Day | |
| 100 | 0 | 20.5 | >30.0 | 0.2 |
| 75 | 25 | 4.0 | 19.2 | 1.5 |
| 50 | 50 | 0.0 | 0.0 | 8 |
| 25 | 75 | 0 | 0 | 17 |

EXAMPLE 3

Hylon VII flour (containing 10 to 13% protein and 2 to 3% lipids) was treated with acetic anhydride to produce a flour acetate having a DS of 0.8, This flour was then blended with the hydroxypropylated high amylose ether and 2.5% microtalc (to provide nucleation) and extrusion processed as in Example 1. The resulting foams had desirable cell structure and displayed good resistance when exposed to high temperature/high humidity storage as shown in the following Table 3.

TABLE 3

| Flour Composition Blends | | | |
|---|---|---|---|
| HYLON VII Flour Acetate | HYLON VII Flour Ether | % Shrinkage 90 F./90% RH | |
| (DS = 0.8) | (7% propylene oxide) | 1 Day | 3 Days |
| 0 | 100 | 6 | 14 |
| 50 | 50 | 0 | 0 |
| 75 | 25 | 0 | 0 |

In addition, the foam extrudates containing the flour acetate displayed some temporary resistance to direct water contact when placed in water and found to remain intact after exposure times of 20 to 30 minutes.

EXAMPLE 4

A blend consisting of high amylose (70%) starch hydroxypropylated with propylene oxide (7%), high amylose (70%) starch acetate DS=1.5 (20 parts) and high amylose (70%) flour (10 parts) was extrusion processed as the above examples with the added nucleation package. The resulting extrudates had excellent foam properties and displayed exceptional resistance to water disintegration. The foams resisted disintegration breakdown for over 12 hours.

What is claimed is:

1. A biodegradable, water and humidity resistant expanded starch product comprising:
   a) from about 25 to 90% by weight of starch or flour modified with up to 15% by weight of alkylene oxide containing 2 to 6 carbon atoms; and
   b) from about 10 to 75% by weight of starch ester having a degree of substitution of from about 1.0 to 1.8, or flour ester having a degree of substitution of 0.3 to 1.1.

2. The starch product of claim 1 wherein the starch or flour used in the alkylene oxide modified component is high amylose starch or flour having at least 40% by weight of amylose content.

3. The starch product of claim 1 wherein high amylose starch or high amylose flour having at least 40% by weight of amylose content is used in the starch ester or flour ester component.

4. The starch product of claim 1 wherein high amylose starch or high amylose flour having at least 40% by weight of amylose content is used in the alkylene oxide modified and ester components.

5. The starch product of claim 1 wherein the starch or flour esters comprise compounds having the formula:

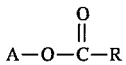

where A is the starch or flour base material and R is an alkyl group of 1 to 7 carbon atoms.

6. The starch product of claim 5 wherein the alkylene oxide contains 2 to 4 carbon atoms.

7. The starch product of claim 6 wherein the alkylene oxide modified starch or flour has 2 to 10% by weight of alkylene oxide.

8. The starch product of claim 7 wherein A is a starch and the ester has a degree of substitution of about 1.2 to 1.6.

9. The starch product of claim 5 wherein from about 40 to 60% by weight of the alkylene oxide modified starch or flour and from about 40 to 60% by weight of the starch ester or flour ester is used.

10. The starch product of claim 2 wherein the high amylose starch or flour has at least 65% by weight of amylose content.

11. The starch product of claim 3 wherein the high amylose starch or flour has at least 65% by weight of amylose content.

12. The starch product of claim 4 wherein the high amylose starch or flour in both components has at least 65% by weight of amylose content.

13. The starch product of claim 5 wherein high amylose starch or high amylose flour having at least 65% by weight of amylose content is used in the alkylene oxide modified and ester components.

14. The starch product of claim 13 wherein the alkylene oxide contains 2 to 4 carbon atoms.

15. The starch product of claim 14 wherein the alkylene oxide modified starch has 2 to 10% by weight of alkylene oxide.

16. The starch product of claim 15 wherein the ester is starch ester having a degree of substitution of about 1.2 to 1.6.

17. The starch product of claim 16 wherein the alkylene oxide is propylene oxide and the R group is an alkyl of 1 carbon atom.

18. The starch product of claim 1 which additionally contains from about 0 to 30% by weight of an underivatized starch or flour.

19. The starch product of claim 18 wherein the underivatized starch or flour is high amylose starch or flour having at least 40% by weight of amylose content.

20. The starch product of claim 18 wherein the alkylene oxide modified component and ester components both comprise high amylose starch having at least 40% by weight of amylose content.

21. The starch product of claim 20 wherein the underivatized component is high amylose flour having at least 40% by weight of amylose content.

22. The method of preparing the starch product of claim 1 wherein the starch is expanded by extrusion.

23. The method of preparing the starch product of claim 17 wherein the starch is expanded by extrusion.

* * * * *